(12) United States Patent
Manolakos et al.

(10) Patent No.: US 11,838,236 B2
(45) Date of Patent: *Dec. 5, 2023

(54) UPLINK CHANNEL QUALITY MEASUREMENT USING A SUBFRAME WITH HIGH-INTENSITY REFERENCE SIGNAL BURSTS

(71) Applicant: QUALCOMM Incorporated, San Diego, CA (US)

(72) Inventors: Alexandros Manolakos, San Diego, CA (US); Jing Jiang, San Diego, CA (US); June Namgoong, San Diego, CA (US); Tao Luo, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/461,679

(22) Filed: Aug. 30, 2021

(65) Prior Publication Data

US 2021/0392024 A1 Dec. 16, 2021

Related U.S. Application Data

(63) Continuation of application No. 16/155,560, filed on Oct. 9, 2018, now Pat. No. 11,133,966, which is a
(Continued)

(51) Int. Cl.
*H04W 4/00* (2018.01)
*H04L 5/00* (2006.01)
(Continued)

(52) U.S. Cl.
CPC .......... *H04L 5/0051* (2013.01); *H04L 5/0048* (2013.01); *H04L 27/2613* (2013.01);
(Continued)

(58) Field of Classification Search
CPC . H04L 5/0051; H04L 5/0048; H04L 27/2613; H04L 5/0082; H04L 5/1469; H04W 72/23; H04W 76/28; H04W 72/042
See application file for complete search history.

(56) References Cited

U.S. PATENT DOCUMENTS

| 8,503,291 B1 | 8/2013 | Lee et al. |
| 8,670,330 B2 | 3/2014 | Chin et al. |

(Continued)

FOREIGN PATENT DOCUMENTS

| CN | 1325196 A | 12/2001 |
| CN | 102893681 A | 1/2013 |

(Continued)

OTHER PUBLICATIONS

Samsung: "Guard Period in UL Backhaul Subframes and DL/UL Timing Design", 3GPP Draft, 3GPP TSG RAN WG1 #58, Shenzhen, China, Aug. 24-Aug. 28, 2009, pp. 1-5.
(Continued)

*Primary Examiner* — Stephen M D Agosta
(74) *Attorney, Agent, or Firm* — Loza & Loza, LLP

(57) ABSTRACT

Aspects of the present disclosure provide a wireless device that communicates with another wireless device utilizing self-contained subframes. The wireless device communicates with a scheduling entity utilizing a plurality of self-contained subframes that include a first subframe and a second subframe. Each of the self-contained subframes includes an uplink (UL) portion and a downlink (DL) portion. The wireless device further receives DL control information from the scheduling entity in the DL portion of
(Continued)

the first subframe, and transmits UL data that includes a plurality of reference signal bursts to the scheduling entity in the UL portion of the first subframe. The plurality of reference signal bursts are uniformly spaced in at least a portion of the UL portion of the first subframe.

16 Claims, 12 Drawing Sheets

Related U.S. Application Data continuation of application No. 15/251,904, filed on Aug. 30, 2016, now Pat. No. 10,122,559.

(60) Provisional application No. 62/311,023, filed on Mar. 21, 2016.

(51) Int. Cl.
*H04L 27/26* (2006.01)
*H04W 76/28* (2018.01)
*H04W 72/23* (2023.01)
*H04L 5/14* (2006.01)

(52) U.S. Cl.
CPC ........... *H04W 72/23* (2023.01); *H04W 76/28* (2018.02); *H04L 5/0082* (2013.01); *H04L 5/1469* (2013.01)

(56) References Cited

U.S. PATENT DOCUMENTS

| | | | |
|---|---|---|---|
| 8,768,359 B2 | 7/2014 | Luo et al. | |
| 9,628,227 B2 | 4/2017 | Aiba et al. | |
| 9,635,648 B2 | 4/2017 | Seo et al. | |
| 10,057,893 B2 | 8/2018 | Chen et al. | |
| 10,122,559 B2 | 11/2018 | Manolakos et al. | |
| 10,342,012 B2 | 7/2019 | Mukkavilli et al. | |
| 10,863,494 B2 | 12/2020 | Zhang et al. | |
| 2007/0115800 A1 | 5/2007 | Fonseka et al. | |
| 2007/0230394 A1 | 10/2007 | Wang et al. | |
| 2009/0129312 A1 | 5/2009 | Jia et al. | |
| 2010/0008445 A1 | 1/2010 | Khan | |
| 2010/0173639 A1 | 7/2010 | Li et al. | |
| 2010/0303034 A1* | 12/2010 | Chen .................. H04L 25/03343 370/329 |
| 2011/0116436 A1* | 5/2011 | Bachu .................. H04L 5/0053 370/312 |
| 2011/0134902 A1 | 6/2011 | Ko et al. | |
| 2011/0142095 A1 | 6/2011 | Guo et al. | |
| 2011/0200143 A1* | 8/2011 | Koo .................... H04B 7/0697 375/299 |
| 2011/0267938 A1 | 11/2011 | Conrad et al. | |
| 2011/0280220 A1* | 11/2011 | Jia ........................ H04W 56/00 370/335 |
| 2012/0020320 A1* | 1/2012 | Issakov ............... G01S 5/02213 370/330 |
| 2012/0106471 A1* | 5/2012 | Behravan .............. H04L 5/0094 370/329 |
| 2012/0157140 A1* | 6/2012 | Kim ...................... H04B 7/024 455/524 |
| 2012/0281654 A1 | 11/2012 | Aiba et al. | |
| 2012/0281783 A1* | 11/2012 | Cheng .................. H04B 7/0456 375/295 |
| 2012/0320859 A1 | 12/2012 | Ahn et al. | |
| 2013/0028229 A1* | 1/2013 | Suh ...................... H04W 48/08 370/329 |
| 2013/0053083 A1* | 2/2013 | Suh ...................... H04L 5/0007 455/517 |
| 2013/0089063 A1 | 4/2013 | Yang et al. | |
| 2013/0107746 A1* | 5/2013 | Wang ................. H04L 25/03343 370/252 |
| 2013/0114455 A1 | 5/2013 | Yoo et al. | |
| 2013/0177102 A1* | 7/2013 | Park ..................... H04B 7/0691 375/295 |
| 2013/0182674 A1* | 7/2013 | Lunttila ................ H04L 5/0085 370/329 |
| 2013/0201941 A1* | 8/2013 | Classon ................ H04L 5/0048 370/329 |
| 2013/0322280 A1* | 12/2013 | Pi ....................... H04W 56/0005 370/252 |
| 2014/0036859 A1 | 2/2014 | Ekpenyong et al. | |
| 2014/0112168 A1* | 4/2014 | Chen .................... H04L 5/0073 370/252 |
| 2014/0112242 A1 | 4/2014 | Vilmur et al. | |
| 2015/0156762 A1 | 6/2015 | Hwang et al. | |
| 2015/0208259 A1 | 7/2015 | Ouchi et al. | |
| 2015/0208302 A1 | 7/2015 | Uemura | |
| 2015/0222340 A1 | 8/2015 | Nagata et al. | |
| 2015/0223085 A1 | 8/2015 | Siomina | |
| 2015/0282159 A1 | 10/2015 | Vrind et al. | |
| 2015/0286271 A1 | 10/2015 | Vrind et al. | |
| 2015/0289289 A1 | 10/2015 | Qian et al. | |
| 2015/0296556 A1 | 10/2015 | Lee et al. | |
| 2015/0350945 A1 | 12/2015 | Chae et al. | |
| 2016/0037550 A1 | 2/2016 | Barabell et al. | |
| 2016/0192385 A1 | 6/2016 | Tooher et al. | |
| 2016/0227485 A1 | 8/2016 | Davydov et al. | |
| 2017/0201300 A1 | 7/2017 | Parkvall et al. | |
| 2017/0272296 A1 | 9/2017 | Manolakos et al. | |
| 2019/0044777 A1 | 2/2019 | Manolakos et al. | |

FOREIGN PATENT DOCUMENTS

| | | | |
|---|---|---|---|
| JP | 2013009414 A | 1/2013 | |
| JP | 2013520862 A | 6/2013 | |
| JP | 2013531413 A | 8/2013 | |
| JP | 2013236394 A | 11/2013 | |
| JP | 2019501565 A | 1/2019 | |
| RU | 2529880 C1 | 10/2014 | |
| WO | 2009099931 A1 | 8/2009 | |
| WO | 2009114800 A2 | 9/2009 | |
| WO | 2011039575 A1 | 4/2011 | |
| WO | 2011143409 A2 | 11/2011 | |
| WO | 2012024587 A1 | 2/2012 | |
| WO | 2012102739 A1 | 8/2012 | |
| WO | 2013169966 | 11/2013 | |
| WO | 2014133311 A1 | 9/2014 | |
| WO | 2016148878 A1 | 9/2016 | |
| WO | 2016175015 A1 | 11/2016 | |

OTHER PUBLICATIONS

Huawei et al., "Short TTI for DL Transmissions", 3GPP TSG RAN WG1, Meeting #84, St Julian's, Malta, R1-160292, Feb. 15-19, 2016, 7 pgs, XP051053632, Retrieved from the Internet: URL: http://www.3gpp.org/ftp/tsg_ran/ WG1_RL1/TSGR1_84/Docs/R1-160292.zip [retrieved on Feb. 14, 2016].

International Preliminary Report on Patentability—PCT/US2017/023459, The International Bureau of WIPO—Geneva, Switzerland, Oct. 4, 2018.

International Search Report and Written Opinion—PCT/US2017/023459—ISA/EPO—Jun. 6, 2017.

Qualcomm Incorporated, "Control Interval and Scheduling Interval", 3GPP TSG-RAN WG1 #86, R1-166361, Aug. 22-26, 2016, Gothenburg, Sweden, pp. 1-7.

Qualcomm Incorporated, "Self-Contained Subframe Timeline Analysis", 3GPP Draft; R1-166362, 3GPP TSG-RAN WG1 #86, R1-166362, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 21, 2016, XP051140182, Retrieved from the Internet: URL: http://www.3gpp.org/ftp/ Meetings_3GPP_SYNC/RAN1/Docs/ [retrieved on Aug. 21, 2016], 7 pages.

Qualcomm Incorporated, "TTI Shortening and Reduced Processing Time for DL Transmissions", 3GPP TSG RAN WG1 #84, R1-160905, Feb. 15-19, 2016, St. Julian's, Malta, 7.3.4.2, pp. 1-3.

(56) References Cited

OTHER PUBLICATIONS

Qualcomm Incorporated: "TTI Shortening and Reduced Processing Time for UL Transmissions", 3GPP Draft; 3GPP TSG RAN WG1 #84, R1-160906 TTI Shortening and Reduced Processing Time for UL Transmissions, 3rd Generation Partnership Project (3GPP), Mobile Competence Centre; 650, Route Des Lucioles; F-06921 SOPHIA-AN, vol. RAN WG1, No. St. Julian's, Malta; Feb. 15, 2016-Feb. 19, 2016, Feb. 14, 2016 (Feb. 14, 2016), pp. 1-5, XP051054230, Retrieved from the Internet: URL: http://www.3gpp.org/ftp/Meetings_3GPP_SYNC/RAN1/Docs/ [retrieved on Feb. 15, 2016).

Texas Instruments, "Design Considerations for Aperiodic SRS," 3GPP TSG RAN WG1 #60bis, R1-102110, Apr. 12-16, 2010, 5 pages, XP050419426, [retrieved on Apr. 6, 2010].

\* cited by examiner

UPLINK CHANNEL QUALITY MEASUREMENT USING A SUBFRAME WITH HIGH-INTENSITY REFERENCE SIGNAL BURSTS

PRIORITY CLAIM

This application is a continuation application of U.S. patent application Ser. No. 16/155,560 filed in the United States Patent and Trademark Office on Oct. 9, 2018, which is a continuation application of U.S. patent application Ser. No. 15/251,904 filed in the United States Patent and Trademark Office on Aug. 30, 2016, which claims priority to and the benefit of provisional Patent Application No. 62/311,023 filed in the United States Patent and Trademark Office on Mar. 21, 2016, the entire content of each of which is incorporated herein by reference.

TECHNICAL FIELD

The technology discussed below relates generally to wireless communication systems, and more particularly, wireless communication utilizing self-contained subframes with reference signal symbols for measuring channel quality.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, channels). Multiple access technologies have been adopted in various telecommunication standards to enable different wireless devices to communicate on a peer-to-peer, municipal, national, regional, and even global level.

In general, a wireless device may transmit a reference signal in an uplink (UL) transmission for measuring channel quality. The reference signal may be transmitted as a known sequence so the receiver can recognize it and use it to estimate the channel quality. One example of such reference signal is the sounding reference signal (SRS) that is generally known in the art. As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the disclosure provides a method of wireless communication operable at a subordinate entity. The subordinate entity communicates with a scheduling entity utilizing a plurality of self-contained subframes that include a first subframe and a second subframe. Each of the self-contained subframes includes an uplink (UL) portion and a downlink (DL) portion. The subordinate entity further receives DL control information from the scheduling entity in the DL portion of the first subframe, and transmits UL data that includes a plurality of reference signal bursts to the scheduling entity in the UL portion of the first subframe. The plurality of reference signal bursts are uniformly spaced in at least a portion of the UL portion of the first subframe.

The transmitted UL data may include a plurality of reference signal bursts in the UL portion of the second subframe, and the plurality of reference signal bursts may be uniformly spaced in at least a portion of the UL portion of the second subframe. The first subframe may have a greater number of reference signal bursts than that of the second subframe.

Another aspect of the disclosure provides a method of wireless communication operable at a scheduling entity. The scheduling entity communicates with a subordinate entity utilizing a plurality of self-contained subframes that include a first subframe and a second subframe. Each of the self-contained subframes includes an uplink (UL) portion and a downlink (DL) portion. The scheduling entity further transmits DL control information to the subordinate entity in the DL portion of the first subframe, and receives UL data that includes a plurality of reference signal bursts from the subordinate entity in the UL portion of the first subframe. The plurality of reference signal bursts are uniformly spaced in at least a portion of the UL portion of the first subframe.

The received UL data may have a plurality of reference signal bursts in the UL portion of the second subframe. The plurality of reference signal bursts may be uniformly spaced in at least a portion of the UL portion of the second subframe, and the first subframe may have a greater number of reference signal bursts than that of the second subframe.

Another aspect of the disclosure provides an apparatus for wireless communication. The apparatus includes a communication interface configured to communicate with a scheduling entity, a memory including executable code, and a processor operatively coupled to the communication interface and the memory. The processor is configured by the executable code to communicate with the scheduling entity utilizing a plurality of self-contained subframes including a first subframe and a second subframe, each of the self-contained subframes including an uplink (UL) portion and a downlink (DL) portion. The processor is further configured to receive DL control information from the scheduling entity in the DL portion of the first subframe. The processor is further configured to transmit UL data including a plurality of reference signal bursts to the scheduling entity in the UL portion of the first subframe. The plurality of reference signal bursts are uniformly spaced in at least a portion of the UL portion of the first subframe.

Another aspect of the disclosure provides an apparatus for wireless communication. The apparatus includes a communication interface configured to communicate with a subordinate entity, a memory including executable code, and a processor operatively coupled to the communication interface and the memory. The processor is configured by the executable code to communicate with the subordinate entity utilizing a plurality of self-contained subframes including a first subframe and a second subframe, each of the self-contained subframes including an uplink (UL) portion and a downlink (DL) portion. The processor is further configured code to transmit DL control information to the subordinate entity in the DL portion of the first subframe. The processor is further configured code to receive UL data including a plurality of reference signal bursts from the subordinate entity in the UL portion of the first subframe. The plurality of reference signal bursts are uniformly spaced in at least a portion of the UL portion of the first subframe.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In next generation or fifth generation (5G) networks, advanced large antenna arrays may provide greater array gains for greater range, larger bandwidths, and/or higher carrier frequencies. During wireless communication, uplink (UL) channel estimation may be performed to determine the channel conditions for beamforming operations in downlink (DL) communication. However, large antenna arrays may have large uplink-downlink power asymmetry that may make uplink channel estimation difficult. Moreover, next generation networks may use increased number of short DL bursts that will provide less time or opportunity for uplink channel estimation.

According to some aspects of the present disclosure, a wireless device may communicate with a base station or another wireless device utilizing self-contained subframes. In certain scenarios, the wireless device may transmit multiple reference signal bursts in the same self-contained subframe to facilitate channel quality estimation. The self-contained subframes and reference signal bursts will be described in more detail below with some examples illustrated in FIGS. 3 and 6-8.

Figure 1:
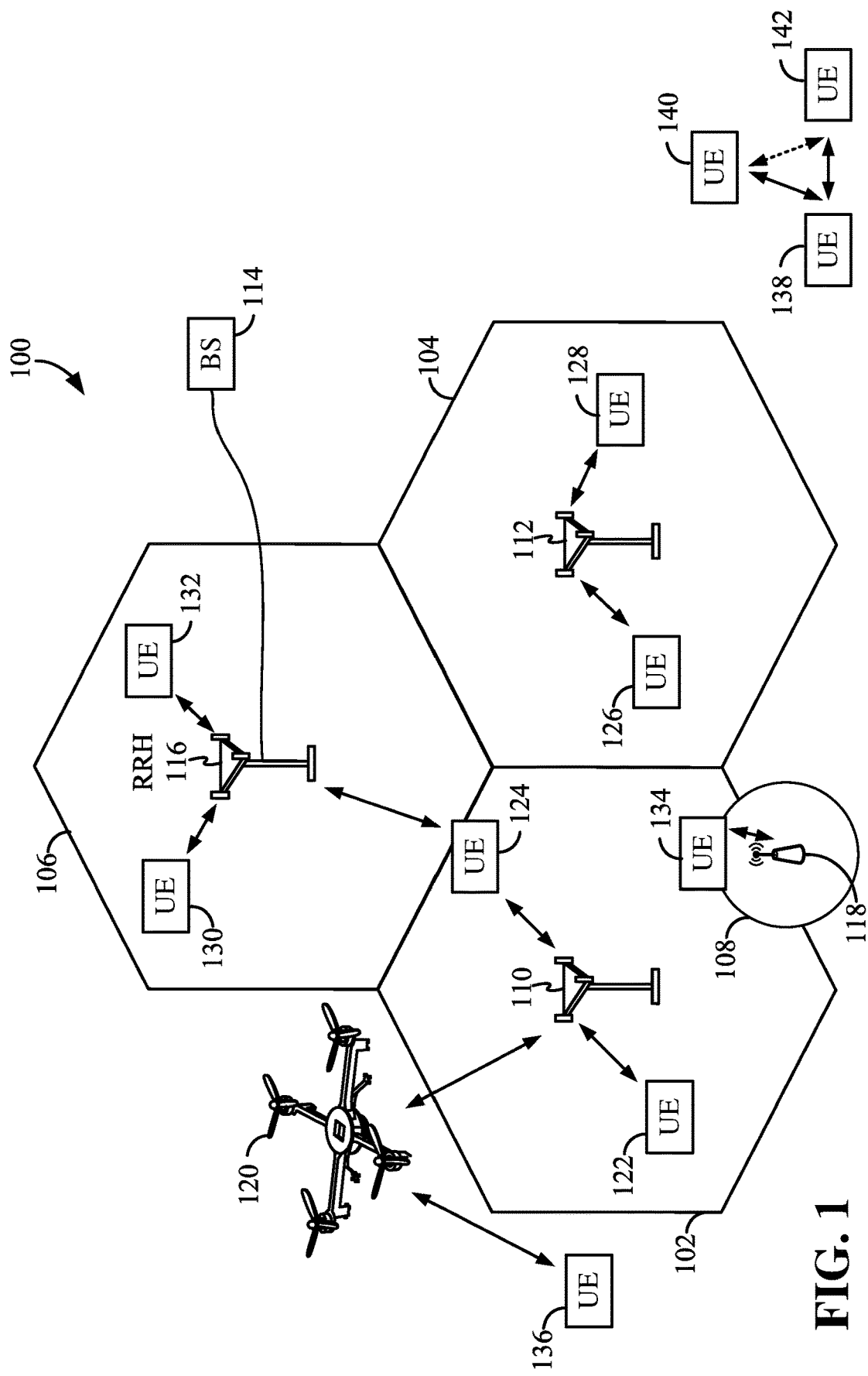
FIG. 1 is a diagram illustrating an example of an access network according to some aspects of the disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a wireless device, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities (e.g., UEs). That is, for scheduled communication, subordinate entities utilize resources allocated by the scheduling entity.

In some examples, the scheduling entity and subordinate entity may utilize self-contained subframes for their communication. Throughout this disclosure, a self-contained subframe includes at least the scheduling control information, the payload data, the acknowledgment or feedback for the payload data, and one or more reference signal symbols.

Base stations are not the only entities that may function as a scheduling entity.

That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138. Two peers may directly communicate with each other using any one of the above-described multiple access schemes including frequency division duplexing (FDD) and time division duplexing (TDD).

Figure 2:
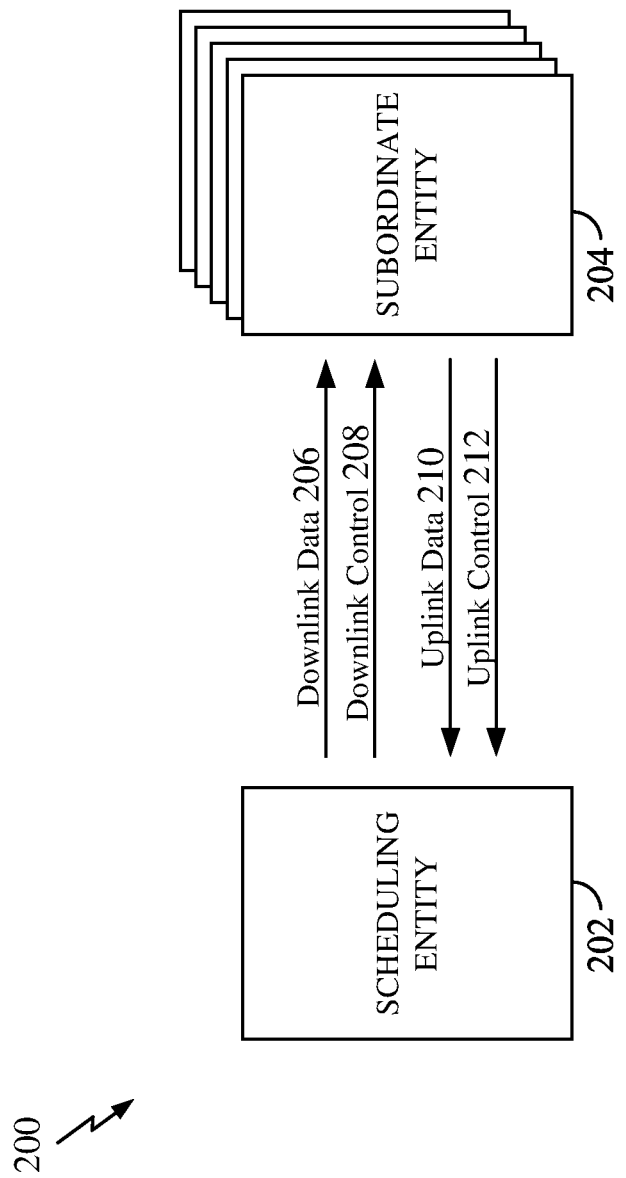
FIG. 2 is a block diagram conceptually illustrating an example of a scheduling entity communicating with one or more subordinate entities according to some aspects of the disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink (DL) may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink (UL) may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

According to some aspects of the present disclosure, a scheduling entity 202 communicates with a subordinate entity 204 using self-contained subframes. In some aspects of the disclosure, a self-contained subframe may be a time division duplexing (TDD) subframe that may be utilized for transmitter-scheduled (Tx-scheduled) transmission. In the present disclosure, a downlink-centric (DL-centric) self-contained subframe is configured based on the assumption that a scheduling entity 202 is scheduled to transmit data (e.g., DL data or payload) on a data channel (e.g., DL channel or portion) to one or more subordinate entities 204. In the present disclosure, an uplink-centric (UL-centric) self-contained subframe is configured based on the assumption that a scheduling entity 202 is scheduled to receive data (e.g., UL data) on a data channel (e.g., UL channel or portion) from a subordinate entity 204.

A self-contained subframe may be full and comprehensive in and of itself. That is, the self-contained subframe may provide control and scheduling information for all of the user data or payload data within the same subframe. Also, the self-contained subframe may include acknowledgment/feedback for all of the user data or payload data within that subframe. Thus, all of the user data packets may be acknowledged prior to the next scheduling instance or subframe. In other words, no further scheduling/control for user data packets will occur until all prior-scheduled user data packets have been acknowledged.

Figure 3:
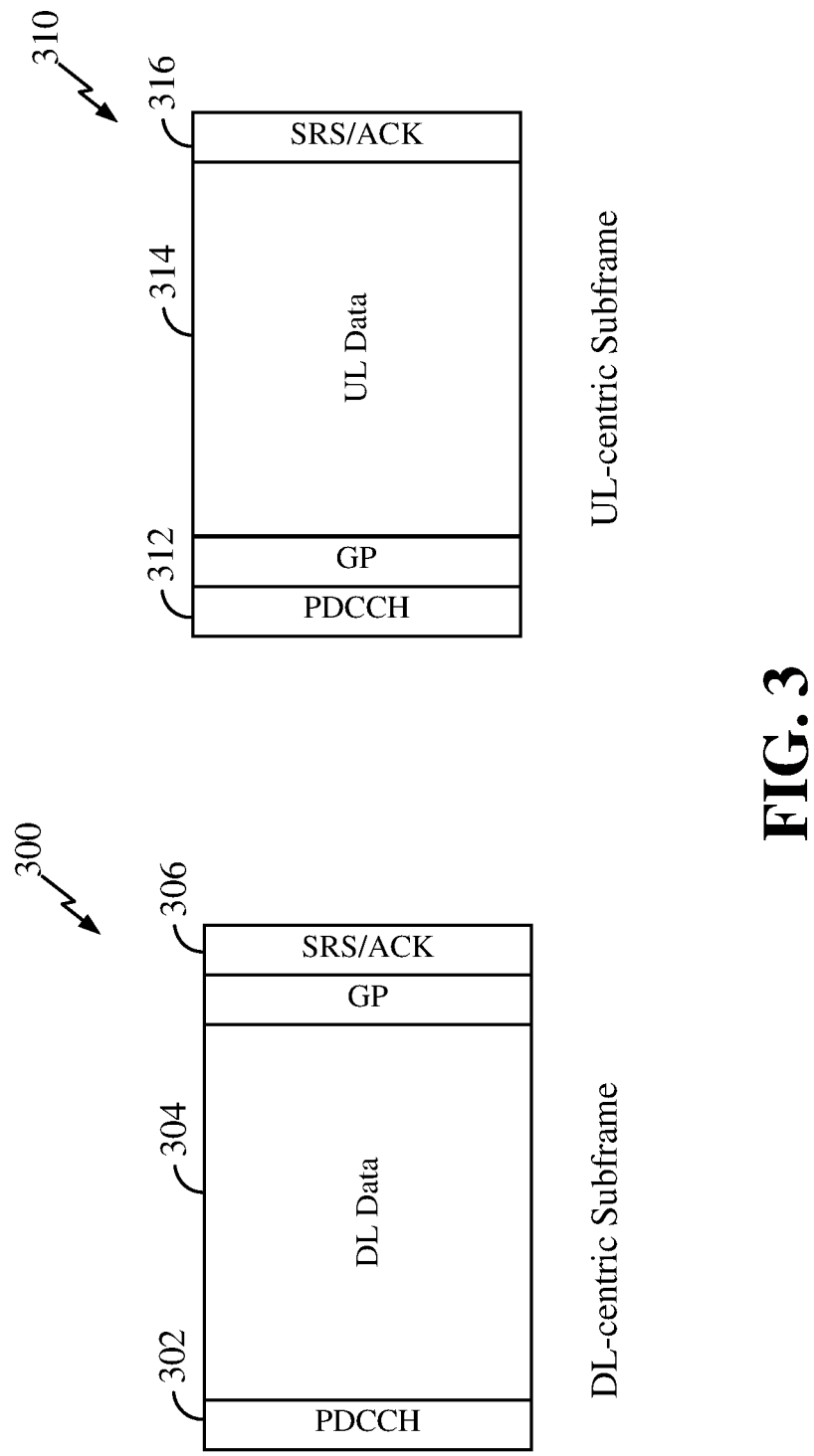
FIG. 3 is a diagram illustrating a downlink-centric self-contained subframe and an uplink-centric self-contained subframe according to some aspects of the disclosure.

FIG. 3 is a diagram illustrating a DL-centric self-contained subframe and an UL-centric self-contained subframe according to some aspects of the disclosure. An exemplary DL-centric subframe 300 includes a DL control portion 302, a DL data portion 304, and a common UL portion 306. The DL data portion 304 and the common UL portion 306 may be separated by a guard period (GP). The GP provides the subordinate entity with a period time to switch or reconfigure its circuitry to receive (DL) or transmit (UL) signals. In the DL control portion 302, a scheduling entity may transmit DL control and/or scheduling information (shown as a physical downlink control channel (PDCCH) as an example) to a subordinate entity. In the DL data portion 304, the scheduling entity may transmit DL user data or payload to the subordinate entity. In the common UL portion 306 (shown as SRS/ACK for example), the subordinate entity may transmit an acknowledgment (e.g., ACK or NACK) and a reference signal burst (e.g., a sounding reference signal (SRS)) to the scheduling entity.

An exemplary UL-centric self-contained subframe 310 includes a DL control portion 312, an UL data portion 314, and a common UL portion 316. In the DL control portion 312, a scheduling entity may transmit DL control and/or scheduling information (shown as PDCCH as an example) to a subordinate entity. In the UL data portion 314, the scheduling entity may receive UL control and/or user data from a subordinate entity. For example, the subordinate entity may transmit UL data via a physical uplink shared channel (PUSCH) and/or a physical uplink control channel (PUCCH) in the UL data portion 314. The DL control portion 312 and UL data portion 314 may be separated by a guard period (GP). The GP provides the subordinate entity with a period time to switch or reconfigure its circuitry to receive or transmit signals. In the common UL portion 316, the subordinate entity may transmit an acknowledgment (e.g., ACK or NACK) and a reference signal burst (e.g., an SRS) to the scheduling entity.

Figure 4:
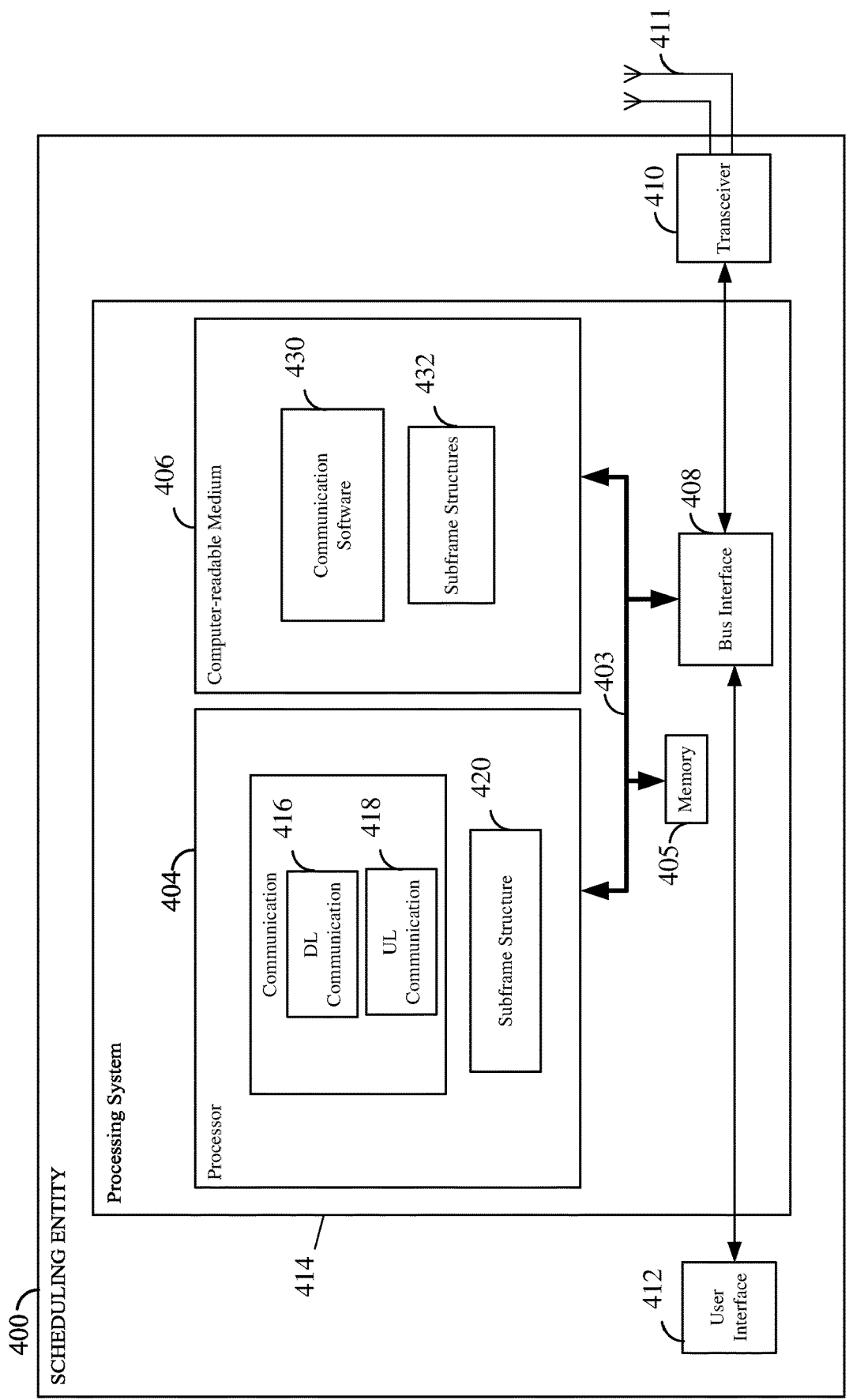
FIG. 4 is a block diagram illustrating an example of a hardware implementation for a scheduling entity according to some aspects of the disclosure.

FIG. 4 is a simplified block diagram illustrating an example of a hardware implementation for a scheduling entity 400 employing a processing system 414. For example, the scheduling entity 400 may be a user equipment (UE) as illustrated in FIGS. 1 and/or 2. In another example, the scheduling entity 400 may be a base station as illustrated in FIG. 1. The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes described below and illustrated in FIGS. 6-10 and 12.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. In some examples, the transceiver 410 may include one or more radio frequency (RF) chains and one or more antennas 411. The RF chains and antennas may be used to transmit and/or receive signals using different precoding. In some examples, depending upon the nature of the apparatus, a user interface 412 (e.g., keypad, display, speaker, microphone, joystick) may also be provided.

In some aspects of the disclosure, the processor 404 may include a communication block including a downlink (DL) communication block 416 and an uplink (UL) communication block 418, configured for communication functions with one or more subordinate entities. For example, the DL and UL communication blocks 416 and 418 may be configured to implement one or more of the communication functions described below in relation to FIGS. 6-12. In some aspects of the disclosure, the processor 404 may include a subframe structure block 420 configured for various functions, including, for example, determining a subframe structure for communication with a subordinate entity. In various aspects of the disclosure, the processor 404 may be configured to implement one or more of the data processing functions operable at a scheduling entity described below in relation to FIGS. 6-12.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

In some aspects of the disclosure, the computer-readable medium 406 includes communication software 430 when executed configure the processor 404 to perform the communication functions described below in relation to FIGS. 6-12. The computer-readable medium 406 may store a number of predetermined subframe structure 432 that may be utilized to communicate with one or more subordinate entities as described below in relation to FIGS. 6-12.

One or more processors 404 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 5:
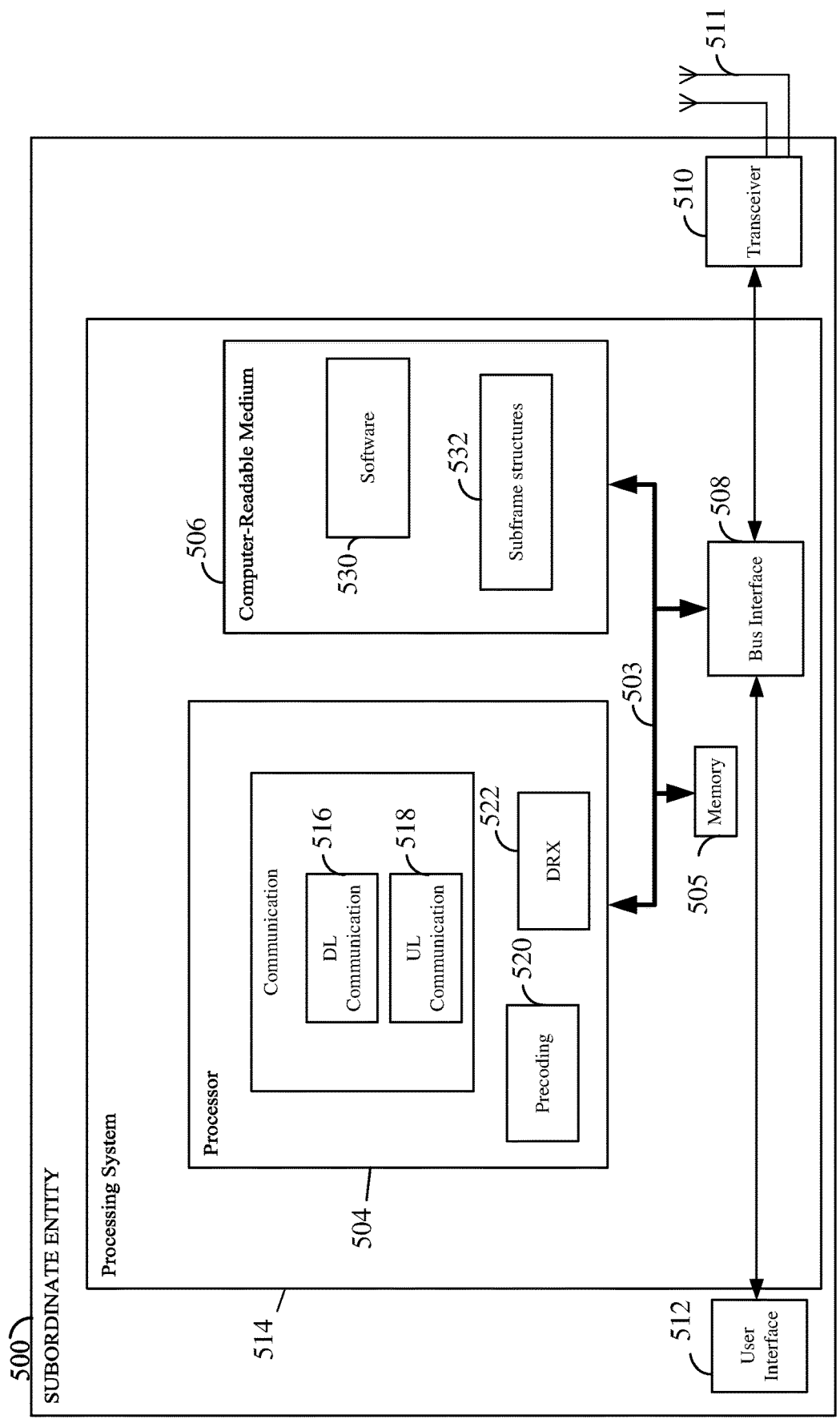
FIG. 5 is a block diagram illustrating an example of a hardware implementation for a subordinate entity according to some aspects of the disclosure.

FIG. 5 is a diagram illustrating an example of a hardware implementation for an exemplary subordinate entity 500 employing a processing system 514. In accordance with various aspects of the disclosure, an element, or any portion of an element, or any combination of elements may be implemented with a processing system 514 that includes one or more processors 504. For example, the subordinate entity 500 may be a user equipment (UE) as illustrated in any one or more of FIGS. 1 and/or 2.

The processing system 514 may be substantially the same as the processing system 414 illustrated in FIG. 4, including a bus interface 508, a bus 502, memory 505, a processor 504, and a computer-readable medium 506. Furthermore, the subordinate entity 500 may include a user interface 512 and a transceiver 510 substantially similar to those described above in FIG. 4. The transceiver 510 provides a communication interface or means for communicating with various other apparatuses over a transmission medium. In some examples, the transceiver 510 may include one or more RF chains and one or more antennas 511. The RF chains and antennas may be used to transmit and/or receive signals using different precoding. That is, the processor 504, as utilized in a subordinate entity 500, may be used to implement any one or more of the processes and functions described below and illustrated in FIGS. 6-12.

In some aspects of the disclosure, the processor 504 may include a communication block including a DL communication block 516 and an UL communication block 518 configured for various functions, including, for example, communication functions with a scheduling entity. For example, the UL and DL communication blocks 516 and 518 may be configured to implement one or more of the communication functions described below in relation to FIGS. 6-12. In some aspects of the disclosure, the processor 504 may include a precoding block 520 configured for various precoding functions, including, for example, precoding sounding reference signals to be transmitted using self-contained subframes. For example, the precoding block 520 may be configured to implement one or more of the precoding functions operable at a subordinate entity described below in relation to FIGS. 6-12. The processor 504 may include a discontinuous reception (DRX) block 522 that may be configured to implement DRX functions described below in relation to FIGS. 6-12.

In one or more examples, the computer-readable storage medium 506 may include computer executable software or code 530 when executed configures the processor 504 to perform various functions, including, for example, the processes and functions described in relation to FIGS. 6-12. The computer-readable medium 506 may store a number of predetermined subframe structures 532 that may be utilized to communicate with a scheduling entity as described below in relation to FIGS. 6-12.

Figure 6:
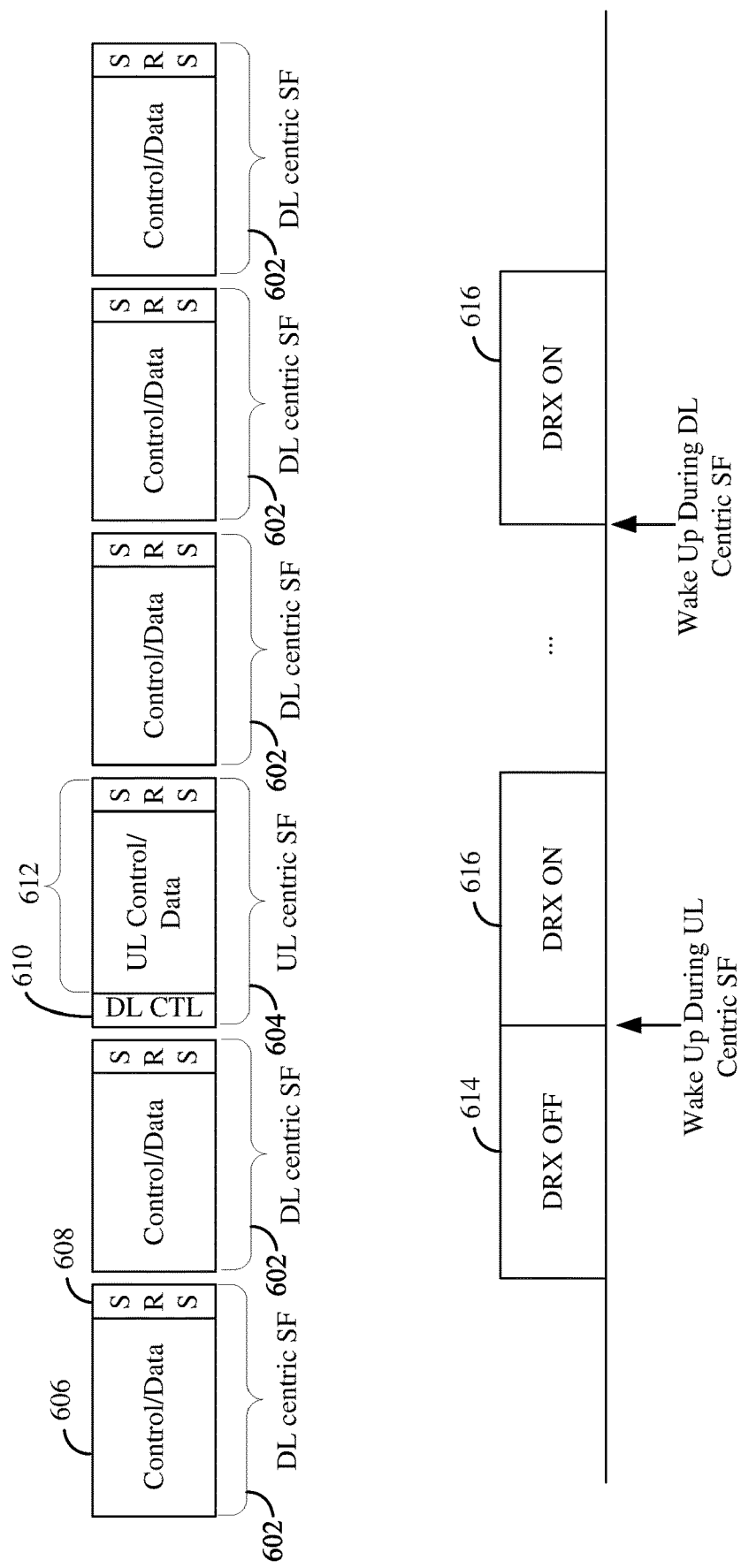
FIG. 6 is a diagram illustrating some examples of self-contained subframes according to some aspects of the disclosure.

FIG. 6 is a diagram illustrating some examples of self-contained subframes in accordance with some aspects of the disclosure. In one example, these self-contained subframes may be utilized for data communication between a scheduling entity 202 and a subordinate entity 204 (see FIG. 2). FIG. 6 illustrates five DL-centric subframes 602 and one UL-centric subframe 604. However, other DL-centric subframe to UL-centric subframe ratios are possible. The DL-centric subframe 602 and UL-centric subframe 604 may be the same as those illustrated in FIG. 3. A DL-centric subframe 602 has a DL portion 606 and a common UL portion 608. The DL portion 606 may include a DL control portion 302 and a DL data portion 304 (see FIG. 3). In the DL portion 606, the scheduling entity 202 may transmit DL control/scheduling data and DL payload data to the subordinate entity 204. In one example, the DL control data may be transmitted in a DL control channel: for example, a PDCCH that may include scheduling information and/or control signaling about a Downlink Shared Channel (DL-SCH) resource allocation, transport format and information related to the DL-SCH Hybrid Automatic Repeat request (ARQ).

In some examples, the subordinate entity 204 may operate in a discontinuous reception (DRX) mode in order to conserve power (e.g., battery power). When operating in the DRX mode, the subordinate entity 204 may stay in a DRX off mode 614 (e.g., a sleep mode or a low power mode) to conserve power, and wakes up periodically in a DRX on mode 616 to read the DL control channel (e.g., PDCCH) to determine whether or not there are data destined for the subordinate entity 204 in the current subframe and/or subsequent subframe(s). If there are data for the subordinate entity 204, the subordinate entity 204 may remain in the wake-up mode to receive the data.

The subordinate entity 204 may wake up during a DL-centric subframe 602 or an UL-centric subframe 604. When the subordinate entity 204 wakes up after spending time in a DRX off mode, the previous channel estimate could potentially be outdated or no longer accurate. The longer the subordinate entity 204 spends in the DRX off mode, the more likely that the previous channel estimate is not up-to-date because the channel conditions and/or the location of the subordinate entity may have significantly changed. Therefore, the scheduling entity 202 may need to estimate the channel condition or quality after waking up from the DRX off mode.

During the common UL portion 608 of the DL-centric subframe, the subordinate entity 204 may transmit a reference signal burst (shown as SRS in FIG. 6) to assist the scheduling entity 202 in estimating channel conditions and acquiring a DL channel. The subordinate entity 204 may also transmit an acknowledgment message (ACK) or a negative acknowledgment message (NACK) in the common UL portion 608 to indicate whether the DL payload is successfully received or not. In one example, the reference signal burst may include a sounding reference signal (SRS) similar to that used in a Long-Term Evolution (LTE) network, and the SRS may be transmitted as the last symbol(s) of an UL slot. The reference signal or SRS may be transmitted by the subordinate entity 204 using a known sequence (e.g., UL demodulation reference signal (DM RS) or pilot), so that the scheduling entity can recognize it and use it to estimate the channel quality.

Similarly, the UL-centric subframe 604 has a DL portion 610 and an UL portion 612. The UL-centric subframe 604 is similar to the DL-centric subframe 602, and redundant descriptions of these subframes may be omitted for brevity. The UL portion 612 includes a data portion for transmitting UL control and/or data, and a common UL portion (shown as SRS in FIG. 6) for transmitting a reference signal burst (e.g., an SRS burst), for example, using one or more channels. Some examples of UL channels are PUCCH and PUSCH.

According to some aspects of the disclosure, a subordinate entity 204 may transmit more than a nominal number of reference signal bursts or symbols to a scheduling entity 202 in certain self-contained subframes (e.g., an UL-centric subframe) under certain conditions to assist the scheduling entity 202 in estimating and acquiring the channel; and otherwise, transmit the nominal number of reference signal bursts in other subframes. For example, the nominal number of reference signal bursts may include a minimum number of reference signal burst(s) transmitted in the common UL portion (e.g., common UL portions 306 and 316 of FIG. 3) of each self-contained subframe. The nominal number of reference signals is not limited to any particular number. A high-intensity SRS burst structure refers to a subframe structure that contains a number of reference signal bursts greater than the nominal number of reference signal bursts.

Figure 7:
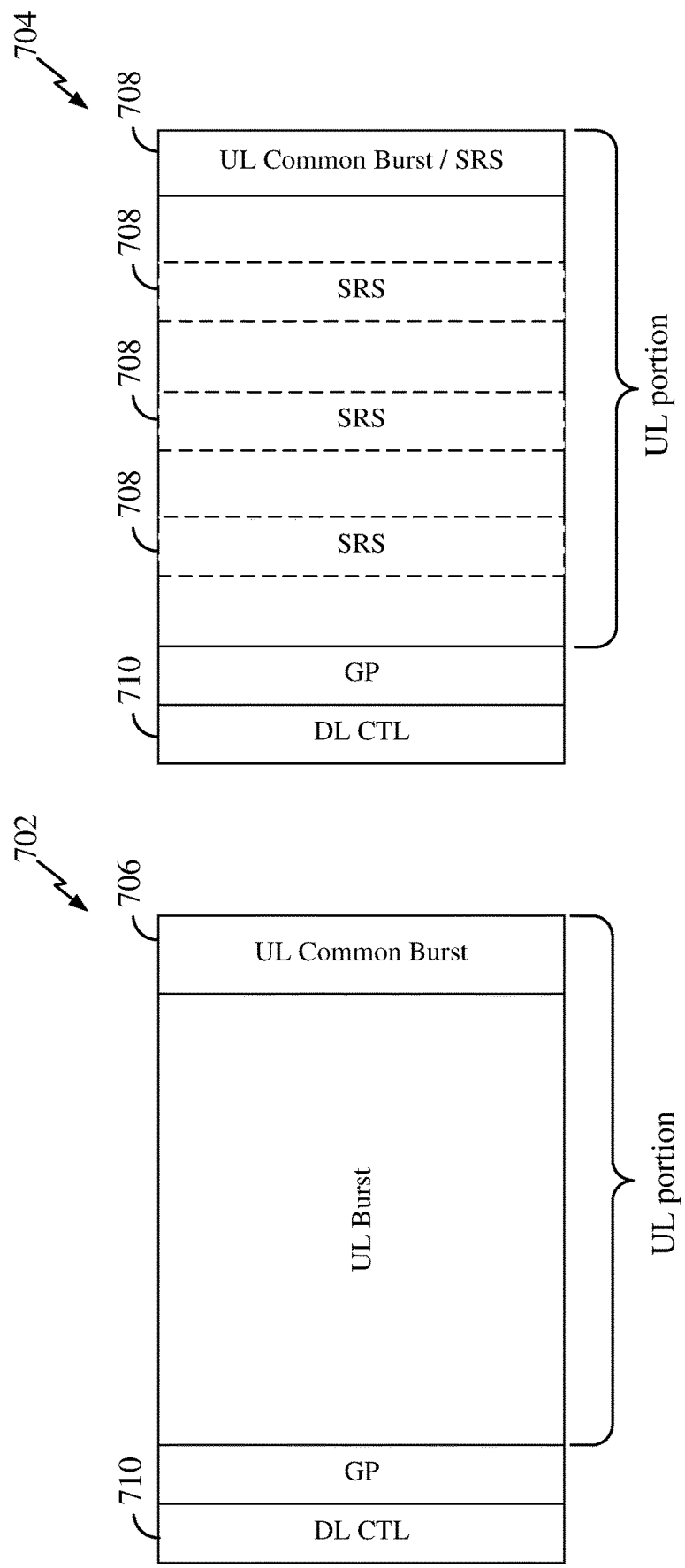
FIG. 7 is a diagram illustrating two uplink-centric self-contained subframes configured to transmit a different number of reference signal bursts according to some aspects of the disclosure.

FIG. 7 is a diagram illustrating two UL-centric self-contained subframes configured to transmit a different number of reference signal bursts according to some aspects of the disclosure. In a first UL-centric subframe 702, a subordinate entity 204 may transmit a nominal number of SRS symbol(s) or a reference signal burst in a common UL portion 706 of the subframe. In this example, a UL common burst, including the nominal number of reference symbols, is transmitted at the last time slot or part of the subframe 702. In some aspects of the disclosure, the reference signal burst may be transmitted in any time slot or UL portion of the subframe 702. In a second UL-centric subframe 704, the subordinate entity 204 may transmit more than the nominal number of reference signal bursts or symbols (shown as SRS 708 in FIG. 7) throughout the UL portion of the subframe. Each reference signal burst may include one or more SRS symbols. When a certain subframe carries more than the nominal number of SRS symbols, this subframe has a high-intensity SRS burst structure or a wake-up burst structure. A scheduling entity 202 may signal to the subordinate entity 204 during a DL control portion 710 (e.g., a PDCCH) the particular SRS burst or wake-up burst structure to be used for the current and/or subsequent subframe(s). The high-intensity SRS burst structure or wake-up burst structure is not limited to a subframe in which the subordinate entity 204 wakes up from a sleep mode.

In some aspects of the disclosure, a wake-up burst structure may have multiple reference signal bursts 708 uniformly or regularly distributed in time in the UL portion of the subframe 704 including the SRS in the UL common burst. In one example, the UL portion may have one SRS burst for every three slots or any predetermined number of slots. A uniform distribution of the SRS symbols may allow for enhanced processing algorithms in the DL side. For example, the periodicity of the SRS bursts 708 may depend on the link quality between the scheduling entity and subordinate entity. The periodicity refers to the particular pattern and timing that the SRS bursts 708 are repeated in the UL portion. When the SRS bursts 708 are uniformly distributed in the subframe, it may facilitate balanced filtering at the scheduling entity side (e.g., an eNB or a base station) after receiving the SRS symbols. For example, in scenarios of high mobility at the subordinate entity, spreading the reference signal bursts uniformly may help the scheduling entity to identify the DL beams that are "persistent" during the whole duration of the UL-centric subframe.

Figure 8:
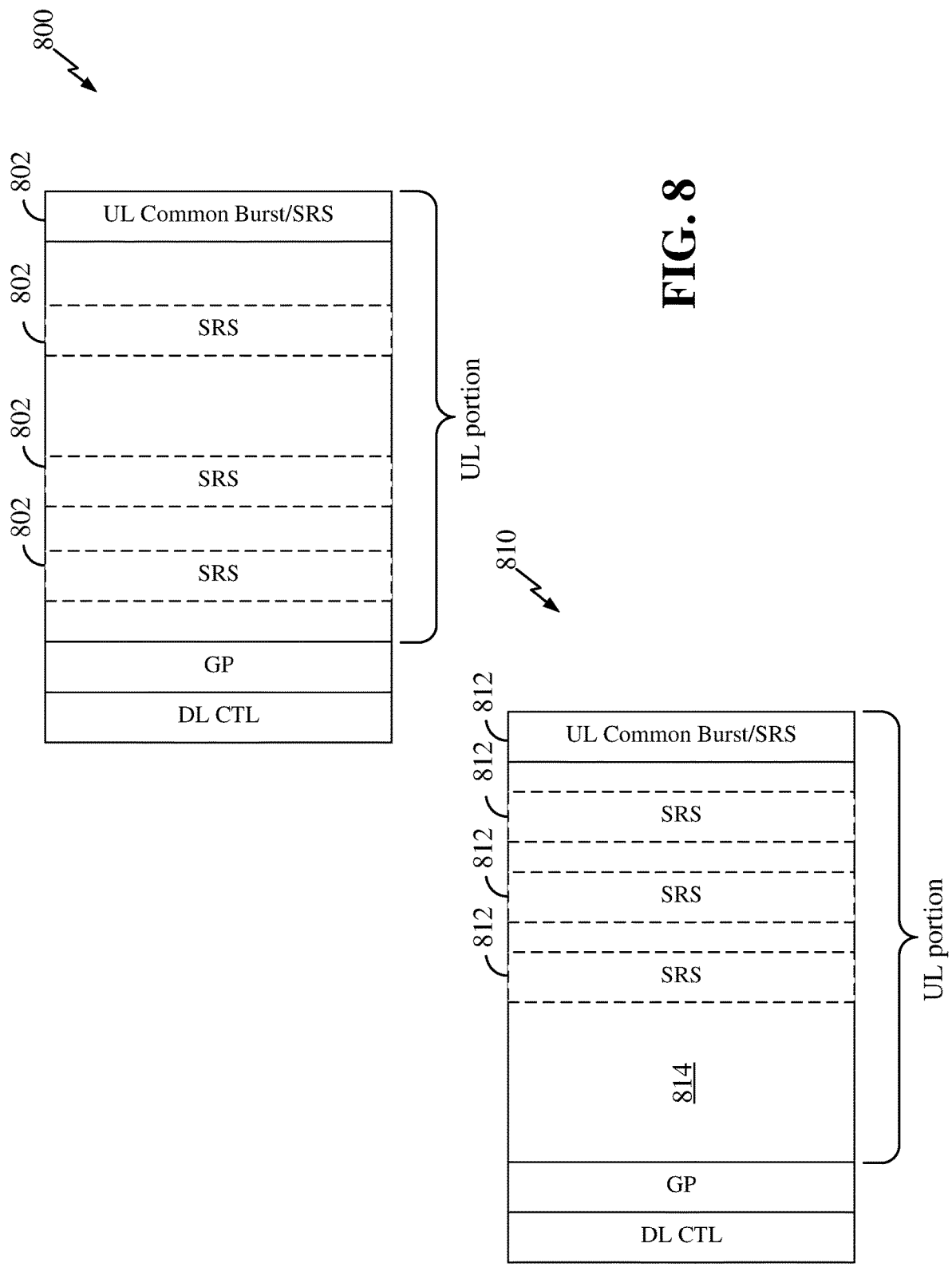
FIG. 8 is a diagram illustrating an uplink-centric self-contained subframe with a non-uniform distribution of reference signal bursts according to an aspect of the disclosure.

In other aspects of the disclosure, the reference signal bursts may be distributed over time according to any predetermined patterns. FIG. 8 is a diagram illustrating an UL-centric self-contained subframe 800 with a non-uniform distribution of reference signal bursts according to an aspect of the disclosure. In this particular example, the subframe 800 have four non-uniformly distributed reference signal bursts 802 including the UL common burst at the end portion of the subframe. In other aspects of the disclosure, other distribution patterns and/or number of reference signal bursts are possible. When the reference signal bursts or SRS symbols are localized in time (e.g., not uniformly distributed among time slots), then in some high mobility scenarios, the scheduling entity 202 may only train the DL beam directions based on the information acquired during the shorter duration of time that the SRS symbols or bursts are located in, instead of the entire duration of the subframe.

In some aspects of the disclosure, an UL-centric self-contained subframe 810 may have uniformly spaced reference signal bursts 812 that are localized in time. For example, the reference signal bursts 812 including the UL common burst may be uniformly spaced in a later part of the UL portion of the subframe 810, while a beginning part 814 of the UL portion does not have reference signal bursts. Here, the beginning part 814 may be longer in duration than the spacing between the reference signal bursts 812.

Figure 9:
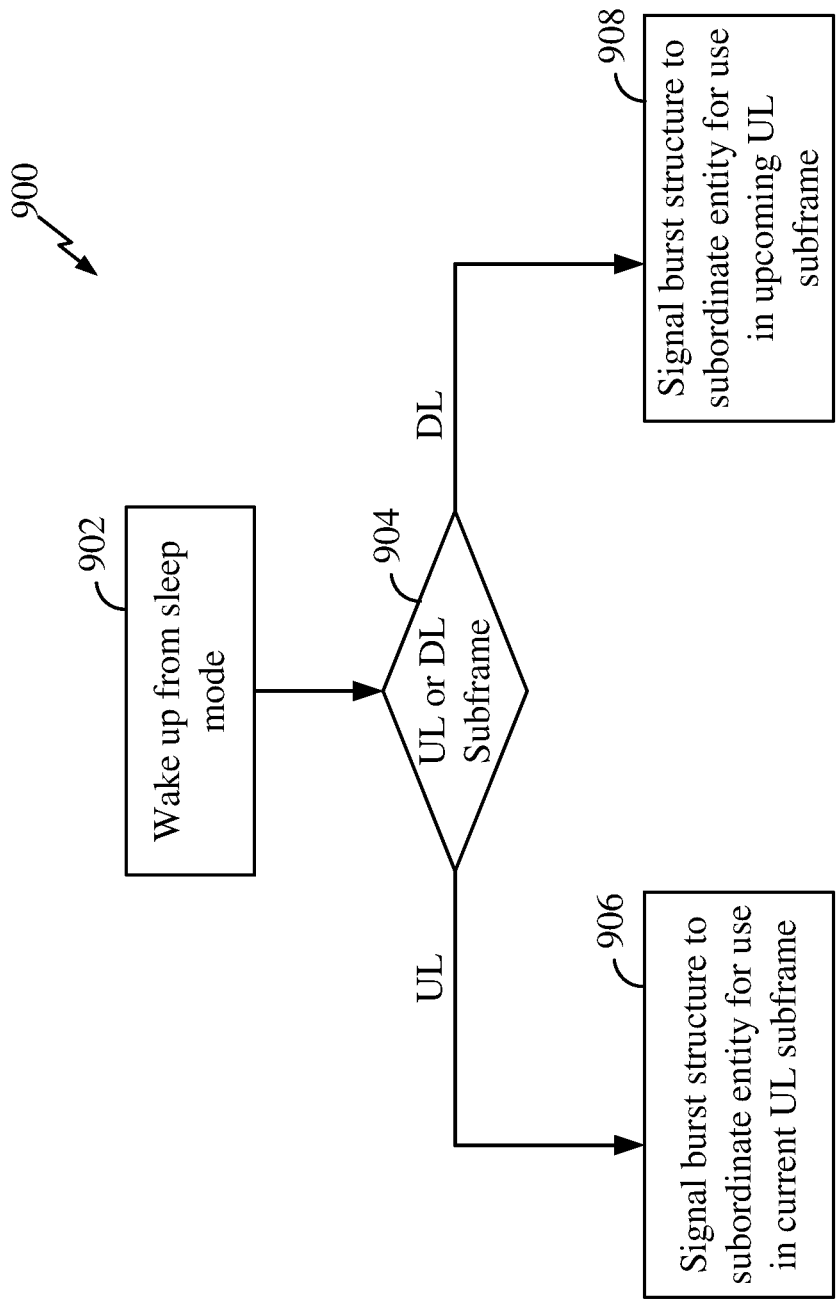
FIG. 9 is a diagram illustrating a process for signaling a reference signal burst structure when a subordinate entity wakes up from a sleep mode according to some aspects of the disclosure.

FIG. 9 is a diagram illustrating a process 900 for signaling a reference signal burst structure or a wake-up burst structure when a subordinate entity wakes up from a sleep mode according to some aspects of the disclosure. At block 902, a subordinate entity 204 may wake up from a sleep mode. For example, the subordinate entity 204 may have been in a DRX off mode for a certain time period to save power. The time that the subordinate entity 204 switches between the DRX on or off mode may be predetermined by the subordinate entity 204 and/or a scheduling entity 202. For example, the subordinate entity 204 may utilize the DRX block 522 (see FIG. 5) to perform its DRX operations. At a decision block 904, the scheduling entity 202 may determine whether the subordinate entity 204 wakes up in an UL-centric subframe or a DL-centric subframe.

At block 906, when the subordinate entity 204 wakes up in an UL-centric subframe (e.g., UL-centric subframe 604 of FIG. 6), the scheduling entity 202 may signal to the subordinate entity 204 in a DL portion 610 (see FIG. 6) the wake-up burst structure to be used for the current UL-centric subframe and/or upcoming subframe(s). In one example, the wake-up burst structure may be defined in various parameters including the number of SRS symbols or reference signal bursts per subframe, locations (e.g., time slot) for transmitting the SRS symbols or bursts, periodicity, precoding scheme, and bandwidth (e.g., wideband or narrowband) of the SRS symbols. In some examples, the subordinate entity 204 may also use the signaled wake-up burst structure in one or more future subframes. At block 908, when the subordinate entity 204 wakes up in a DL-centric subframe (e.g., DL-centric subframe 602 of FIG. 6), the scheduling entity 202 may signal to the subordinate entity 204 the wake-up burst structure to be used for the upcoming UL-centric subframe(s). It is because the DL-centric subframe offers limited opportunity for UL transmission of the multiple SRS reference signal bursts. The subordinate entity 204 waits for the upcoming UL-centric subframe to transmit the high-intensity reference signal bursts.

In one aspect of the disclosure, the scheduling entity 202 may inform the subordinate entity 204 the structure or format of the SRS burst(s) by transmitting one or more of Radio Resource Control (RRC) messages such as system information block 2 (SIB2), RRC Connection Setup, RRC Connection Reconfiguration, or other control messages, etc. In other aspects of the disclosure, the scheduling entity and subordinate entity may use other signaling protocols or procedures to communicate the structure of the SRS burst.

Figure 10:
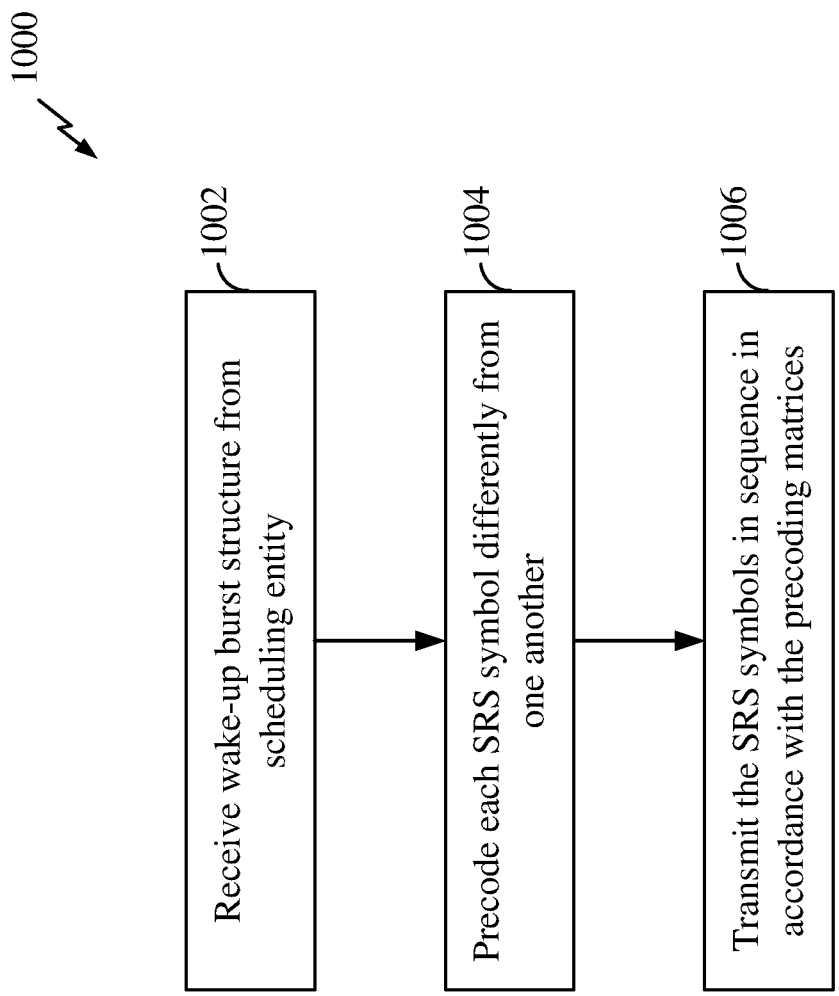
FIG. 10 is a diagram illustrating a precoding scheme for transmitting multiple reference signal bursts according to an aspect of the disclosure.

FIG. 10 is a diagram illustrating a precoding scheme for transmitting multiple reference signal bursts according to an aspect of the disclosure. At block 1002, a subordinate entity 204 receives a wake-up burst structure from a scheduling entity 202. The wake-up burst structure may indicate that the subordinate entity can utilize different precoding to transmit the SRS symbols or bursts. Precoding is a technique which can exploit transmit diversity. The SRS symbols may be precoded (e.g., using a precoding matrix) to generate a set of modulation symbols that can be mapped onto the subcarriers. Precoding involves multiplying the layers matrix with a precoding matrix, which creates the antenna port subcarrier values that are sent to an OFDMA mapper and then to the antenna ports.

At block 1004, the subordinate entity 204 may precode each SRS symbol differently from one another, for example, based on a predefined or predetermined codebook selection that is known to both the scheduling entity and the subordinate entity. This allows the scheduling entity to estimate the uplink channel for different precoding options and notify the subordinate entity at the upcoming subframe which precoding matrix should be used by the subordinate entity for the reception of the downlink transmissions. The scheduling entity may signal a codebook selection to the subordinate entity during the DL control (e.g., PDCCH) portion of the UL-centric subframe before the transmission of the SRS symbols or reference signal bursts. At block 1006, the subordinate entity 204 may transmit the SRS symbols in sequence in accordance with the precoding matrices that are included in the signaled codebook. In some examples, the SRS symbols may be precoded using different precoding matrices.

In one particular example, the scheduling entity 202 may request the subordinate entity 204 to transmit more than nominal number of SRS symbols in X number of slots (e.g., X is 2 or more) of an UL-centric subframe from all its antennas (e.g., 2 or more antennas) using different precoding for each symbol. This may help the scheduling entity to narrow down the beam directions that is receiving from the subordinate entity. An example of different precoding methods is to transmit the SRS symbols from a different subset of antennas (one or more antennas in a subset) at each symbol. When an antenna is not transmitting the SRS symbols, it may be transmitting symbols with a zero value.

Figure 11:
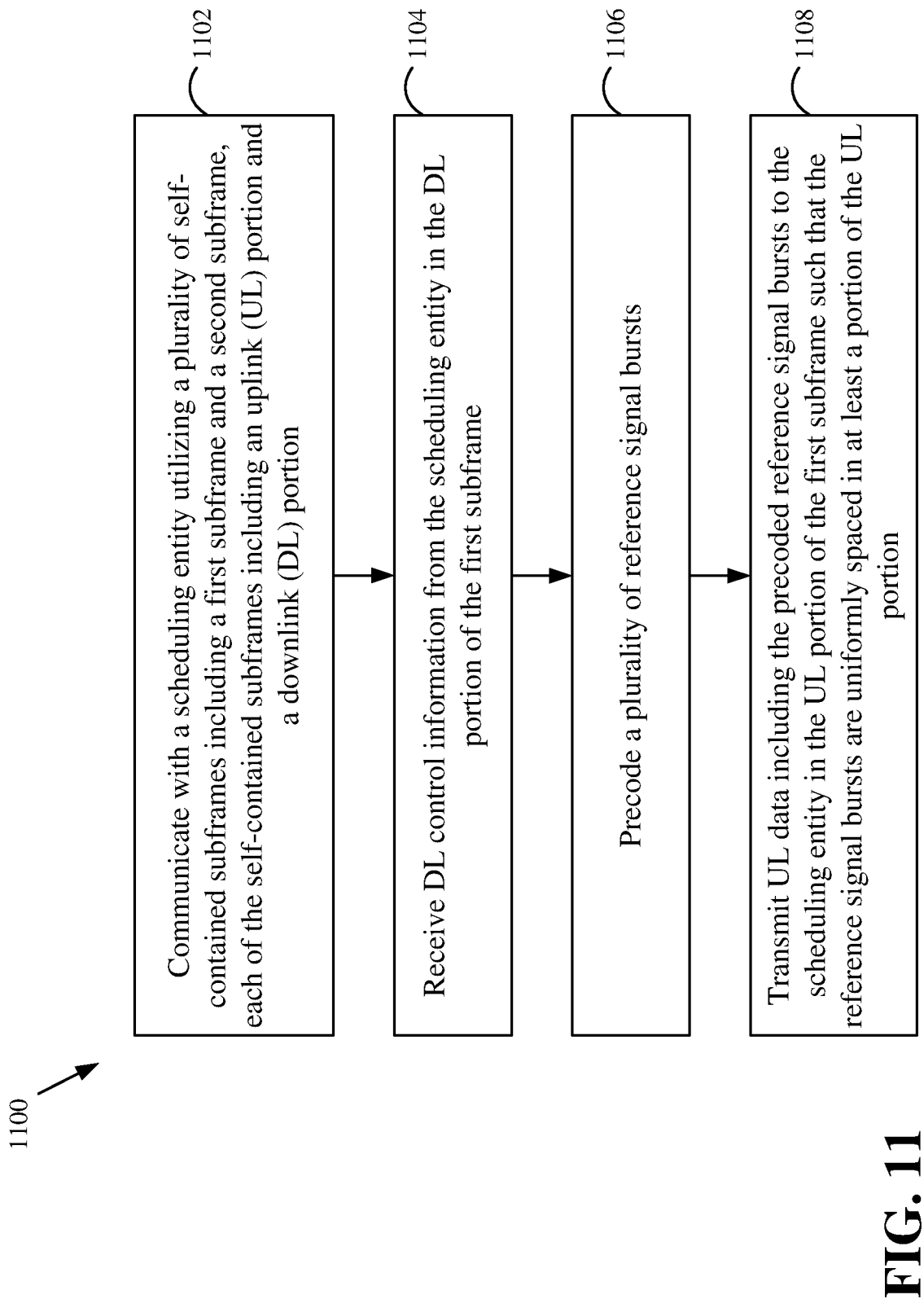
FIG. 11 is a flow chart illustrating a method for transmitting more than a nominal number of reference signal bursts at a subordinate entity according to some aspects of the disclosure.

FIG. 11 is a flow chart illustrating a method 1100 of transmitting more than a nominal number of reference signal bursts operable at a subordinate entity 204 according to some aspects of the disclosure. At block 1102, the subordinate entity 204 may communicate with a scheduling entity 202 utilizing a plurality of self-contained subframes including a first subframe and a second subframe. Each of the self-contained subframes includes an UL portion and a DL portion similar to those shown in FIGS. 6-8. At block 1104, the subordinate entity 204 receives DL control information from the scheduling entity in the DL portion of the first subframe. The DL control information may include a suggested structure of the reference signal bursts. In one example, the first subframe may be the subframe 704 of FIG. 7.

At block 1106, the subordinate entity 204 precode a plurality of reference signal bursts. For example, the subordinate entity 204 may utilize the precoding block 520 (see FIG. 5) to code the reference signal bursts. In some examples, the reference signal bursts may be precoded using different precoding matrices. At block 1108, the subordinate entity 204 transmits UL data including the precoded reference signal bursts to the scheduling entity in the UL portion of the first subframe such that the reference signal bursts are uniformly spaced in at least a portion of the UL portion. The UL data may include more than a nominal number of reference signal bursts that are precoded differently. In one aspect of the disclosure, the UL data of the first subframe includes a greater number of reference signal bursts than that of the second subframe. For example, the reference signal bursts may be the reference signal bursts 708 of the UL-centric subframe 704 of FIG. 7. Using different precoding allows the subordinate entity to transmit the reference signal bursts using different antennas. In some aspects of the disclosure, the scheduling entity 202 may request the subordinate entity 204 to utilize continuous phase modulation or constant phase modulation to transmit the reference signal bursts. In some examples, the subordinate entity 204 may decide on its own and notify the scheduling entity 202 that the reference signal bursts are transmitted utilizing continuous phase modulation or constant phase modulation. The subordinate entity may configure the UL data to indicate that the reference signal bursts conform with the suggested structure.

Figure 12:
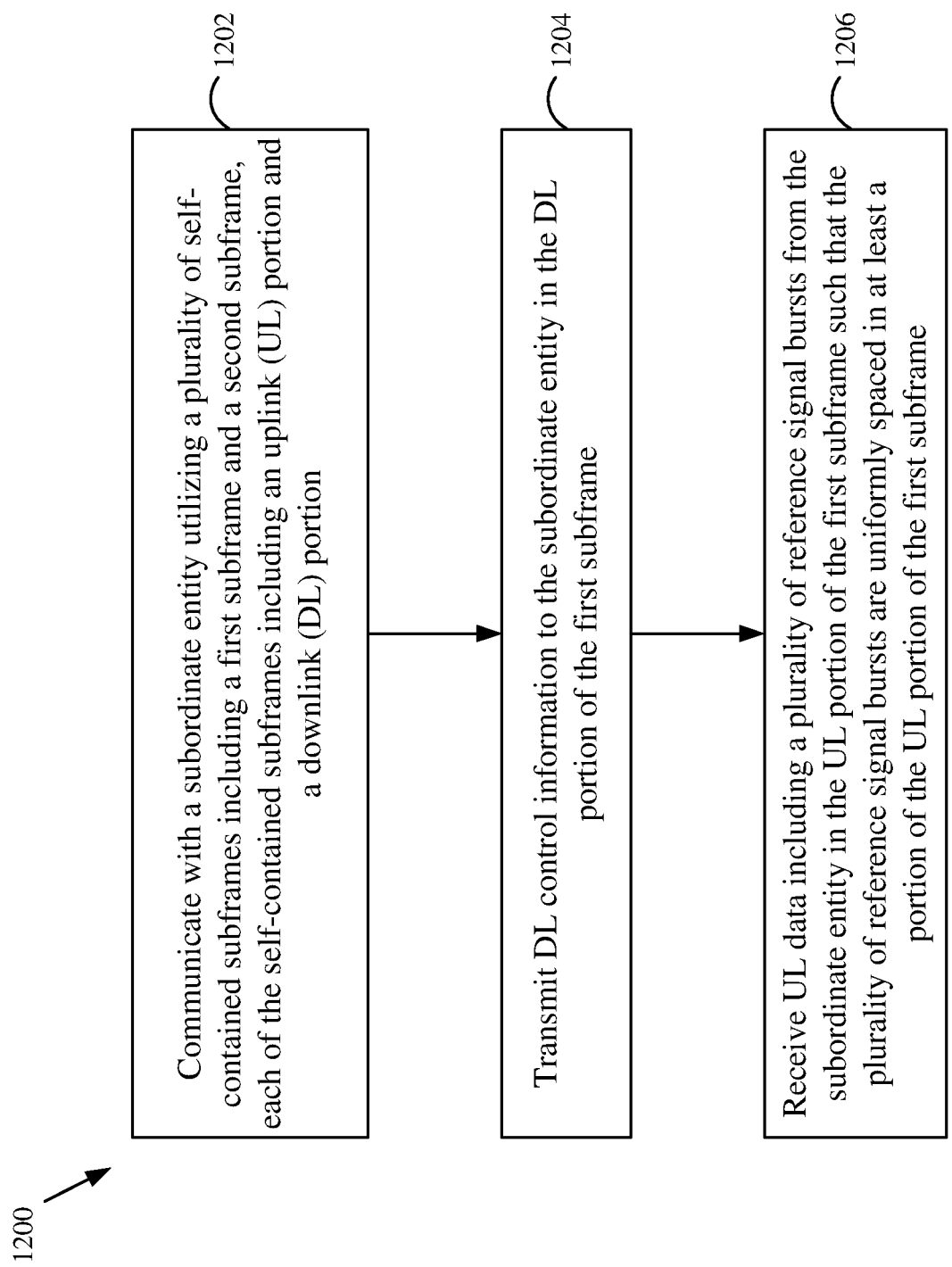
FIG. 12 is a flow chart illustrating a method for receiving more than a nominal number of reference signal bursts at a scheduling entity according to some aspects of the disclosure.

FIG. 12 is a flow chart illustrating a method 1200 of receiving a high-intensity reference signal bursts operable at a scheduling entity 202 according to some aspects of the disclosure. At block 1202, a scheduling entity 202 communicates with a subordinate entity 204 utilizing a plurality of self-contained subframes including a first subframe and a second subframe, each of the self-contained subframes including an UL portion and a DL portion similar to those shown in FIGS. 6-8. At block 1204, the scheduling entity 202 transmits DL control information to the subordinate entity in the DL portion of the first subframe. The DL control information may include a suggested structure of the reference signal bursts. In one example, the first subframe may be the UL-centric subframe 704 of FIG. 7. The DL control information may be configured to request the subordinate entity to transmit the plurality of reference signal bursts by different precoding and/or antennas, respectively.

In one aspect of the disclosure, the scheduling entity may determine the suggested structure of the reference signal bursts based on various factors. For example, the scheduling entity may determine the suggested structure based on a time duration that the subordinate entity has been in a sleep mode. The scheduling entity may determine the suggested structure based on a link quality between the subordinate entity and the scheduling entity in a previous wake-up period. The scheduling entity may determine the suggested structure based on an amount of DL data scheduled to be transmitted by the scheduling entity. The scheduling entity may determine the suggested structure based on a delay spread of an uplink channel between the scheduling entity and the subordinate entity or a Doppler spread of an uplink channel between the scheduling entity and the subordinate entity.

At block 1206, the scheduling entity 202 receives UL data including a plurality of reference bursts from the subordinate entity in the UL portion of the first subframe. The plurality of reference signal bursts are uniformly spaced in at least a portion of the UL portion of the subframe. In this example, the UL data includes high-intensity reference signal bursts because it contains a greater number of reference signal bursts than a nominal number of reference signal bursts. In some examples, the reference signal bursts may be precoded differently such that the reference signal bursts may be transmitted by different subsets (one or more antennas) of antennas.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 6-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, and/or 5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a subordinate entity, the method comprising:
   communicating with a scheduling entity utilizing a plurality of subframes comprising a first subframe and a second subframe, each of the subframes comprising an uplink (UL) portion and a downlink (DL) portion;
   receiving DL control information (DCI) from the scheduling entity in the DL portion of the first subframe; and
   transmitting, to the scheduling entity, a first UL transmission comprising a burst structure including a plurality of reference signal bursts distributed in time in the UL portion of the first subframe based on the DCI, each of the plurality of reference signal bursts being transmitted using different precoding in a different time slot of the UL portion of the first subframe,
   the plurality of reference signal bursts being transmitted using a different subset of antennas of the subordinate entity for each of the plurality of reference signal bursts, one or more of the plurality of reference signal bursts being transmitted using a first subset of the antennas, one or more of the reference signal bursts being transmitted using a second subset of the antennas,
   wherein the burst structure comprises a greater number of reference signal bursts than a nominal number of reference signal bursts transmitted in the second subframe.

2. The method of claim 1, wherein the UL portion comprises a beginning part and a later part; and
   wherein transmitting the first UL transmission comprises distributing the plurality of reference signal bursts such that the plurality of reference signal bursts are uniformly spaced apart in the later part of the UL portion of the first subframe, the beginning part being longer than a temporal spacing between the reference signal bursts.

3. The method of claim 1, wherein transmitting the first UL transmission comprises transmitting no reference signal bursts in a beginning part of the UL portion of the first subframe, the beginning part being longer in duration than a temporal spacing between the reference signal bursts in a later part of the UL portion.

4. The method of claim 1, wherein the DCI comprises a plurality of parameters including at least one of: a number of reference signal bursts per subframe, a time slot for transmitting the reference signal bursts, a periodicity, a precoding scheme, and a bandwidth of the reference signal bursts.

5. The method of claim 1, further comprising waking up from a discontinuous reception (DRX) off mode to receive the DCI.

6. An apparatus for wireless communication, comprising:
   a communication interface configured to communicate with a scheduling entity;
   a memory; and
   a processor coupled to the communication interface and the memory, wherein the processor and the memory are configured to:

communicate with the scheduling entity utilizing a plurality of subframes comprising a first subframe and a second subframe, each of the subframes comprising an uplink (UL) portion and a downlink (DL) portion;

receive DL control information (DCI) from the scheduling entity in the DL portion of the first subframe; and transmit, to the scheduling entity, a first UL transmission comprising a burst structure including a plurality of reference signal bursts distributed in time in the UL portion of the first subframe based on the DCI, each of the plurality of reference signal bursts being transmitted using different precoding in a different time slot of the UL portion of the first subframe, the plurality of symbols respectively corresponding to different time slots in the UL portion, the plurality of reference signal bursts being transmitted using a different subset of antennas of the subordinate entity for each of the plurality of reference signal bursts, one or more of the plurality of reference signal bursts being transmitted using a first subset of the antennas, one or more of the reference signal bursts being transmitted using a second subset of the antennas, wherein the burst structure comprises a greater number of reference signal bursts than a nominal number of reference signal bursts transmitted in the second subframe.

7. The apparatus of claim 6, wherein the UL portion comprises a beginning part and a later part, and the processor and the memory are further configured to:

distribute the plurality of reference signal bursts such that the plurality of reference signal bursts are uniformly spaced apart in the later part of the UL portion of the first subframe, the beginning part being longer than a temporal spacing between the reference signal bursts.

8. The apparatus of claim 6, wherein the processor and the memory are further configured to:

transmit no reference signal bursts in a beginning part of the UL portion of the first subframe, the beginning part being longer in duration than a temporal spacing between the reference signal bursts in a later part of the UL portion.

9. The apparatus of claim 6, wherein the DCI comprises a plurality of parameters including at least one of: a number of reference signal bursts per subframe, a time slot for transmitting the reference signal bursts, a periodicity, a precoding scheme, and a bandwidth of the reference signal bursts.

10. The apparatus of claim 6, wherein the processor and the memory are further configured to wake up from a discontinuous reception (DRX) off mode to receive the DCI.

11. A method of wireless communication operable at a scheduling entity, the method comprising:

communicating with a subordinate entity utilizing a plurality of subframes comprising a first subframe and a second subframe, each of the subframes comprising an uplink (UL) portion and a downlink (DL) portion;

transmitting DL control information (DCI) to the subordinate entity in the DL portion of the first subframe; and receiving, from the subordinate entity, a first UL transmission comprising a burst structure including a plurality of reference signal bursts distributed in time in the UL portion of the first subframe based on the DCI, each of the plurality of reference signal bursts comprising different precoding in a different time slot of the UL portion of the first subframe, the plurality of reference signal bursts being received from a different subset of antennas of the subordinate entity for each of the plurality of reference signal bursts, one or more of the plurality of reference signal bursts being received from a first subset of the antennas, one or more of the reference signal bursts being received from a second subset of the antennas, wherein the burst structure comprises a greater number of reference signal bursts than a nominal number of reference signal bursts transmitted in the second subframe.

12. The method of claim 11, wherein the UL portion comprises a beginning part and a later part, and the plurality of reference signal bursts are uniformly spaced apart in the later part of the UL portion of the first subframe, the beginning part being longer than a temporal spacing between the reference signal bursts.

13. The method of claim 11, wherein receiving the first UL transmission comprises receiving no reference signal bursts in a beginning part of the UL portion of the first subframe, the beginning part being longer in duration than a temporal spacing between the reference signal bursts in a later part of the UL portion.

14. An apparatus for wireless communication, comprising:

a communication interface configured to communicate with a subordinate entity;

a memory; and a processor operatively coupled to the communication interface and the memory, wherein the processor and the memory are configured to:

communicate with the subordinate entity utilizing a plurality of subframes comprising a first subframe and a second subframe, each of the subframes comprising an uplink (UL) portion and a downlink (DL) portion;

transmit DL control information (DCI) to the subordinate entity in the DL portion of the first subframe; and receive, from the subordinate entity, a first UL transmission comprising a burst structure including a plurality of reference signal bursts distributed in time in the UL portion of the first subframe based on the DCI, each of the plurality of reference signal bursts comprising different precoding in a different time slot of the UL portion of the first subframe, the plurality of reference signal bursts being received from a different subset of antennas of the subordinate entity for each of the plurality of reference signal bursts, one or more of the plurality of reference signal bursts being received from a first subset of the antennas, one or more of the reference signal bursts being received from a second subset of the antennas, wherein the burst structure comprises a greater number of reference signal bursts than a nominal number of reference signal bursts transmitted in the second subframe.

15. The apparatus of claim 14, wherein the UL portion comprises a beginning part and a later part, and the plurality of reference signal bursts are uniformly spaced apart in the later part of the UL portion of the first subframe, the beginning part being longer than a temporal spacing between the reference signal bursts.

16. The apparatus of claim 14, wherein the processor and the memory are further configured to:

receive no reference signal bursts in a beginning part of the UL portion of the first subframe, the beginning part being longer in duration than a temporal spacing between the reference signal bursts in a later part of the UL portion.

* * * * *